UNITED STATES PATENT OFFICE.

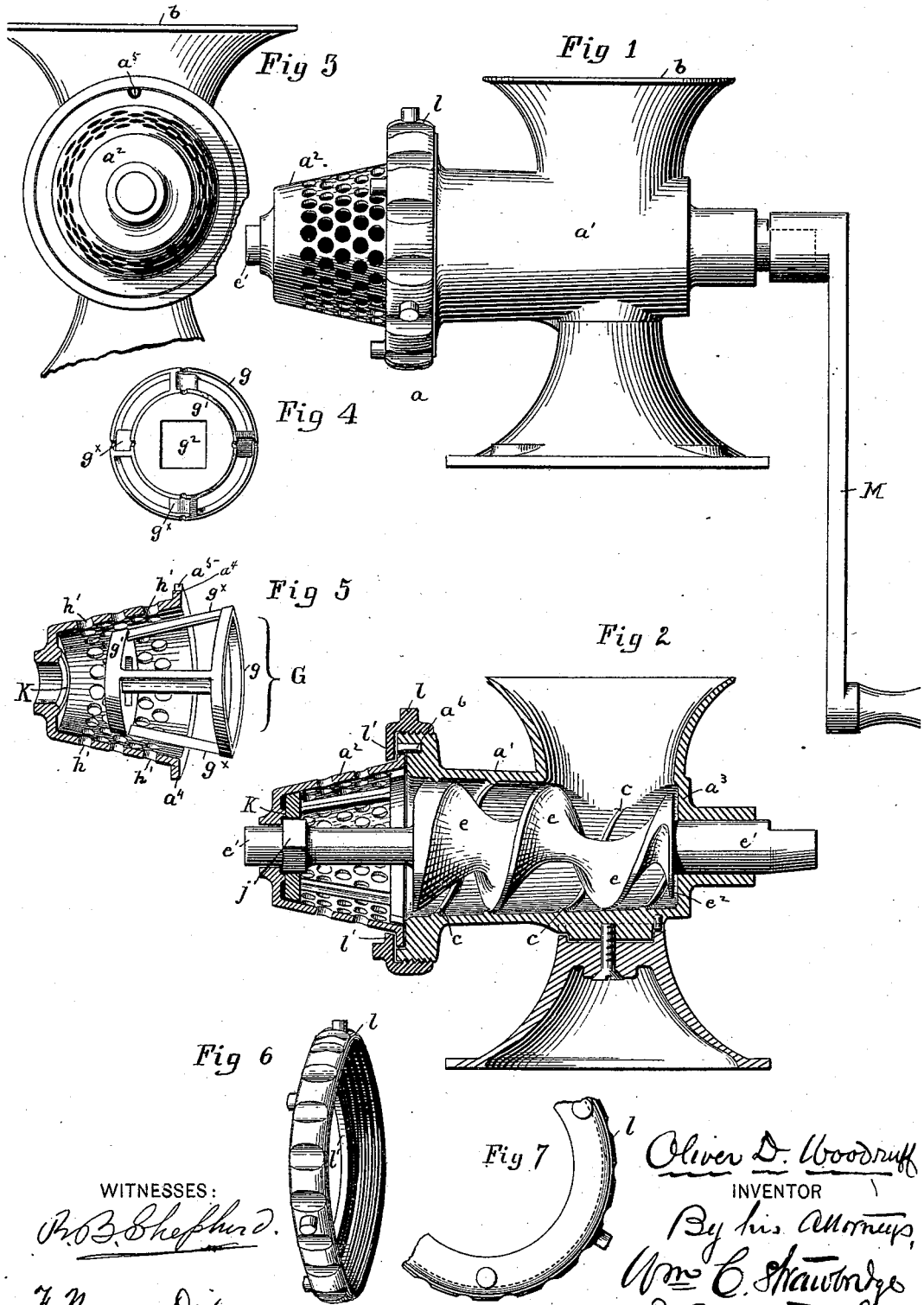

OLIVER D. WOODRUFF, OF SOUTHINGTON, CONNECTICUT, ASSIGNOR TO THE AMERICAN MACHINE COMPANY, OF PHILADELPHIA, PENNSYLVANIA.

MEAT-CUTTER.

SPECIFICATION forming part of Letters Patent No. 374,568, dated December 6, 1887.

Application filed August 4, 1887. Serial No. 246,093. (No model.)

*To all whom it may concern:*

Be it known that I, OLIVER D. WOODRUFF, a citizen of the United States, residing at Southington, in the county of Hartford, and State of Connecticut, have invented certain new and useful Improvements in Meat Cutters, of which the following is a specification.

My invention relates generally to that particular class of machines employed for mincing or cutting up meat or other yielding substances, which comprehend in connection with many minor details of construction, a cylindrical casing, a rotatable feed shaft contained therein, a fixed conical shell, and a knife adapted to be rotated against the face of and to have a shearing action in connection with said conical shell,—and it is an improvement upon a machine relating to the same class of devices, invented by me and forming the subject of United States Letters Patent No. 352,023, granted November 2, 1886, upon my application, and also an improvement upon a machine relating to the same class of devices, forming the subject of United States Letters Patent granted to me the 9th day of August, 1887 and numbered 368,041.

My present invention relates particularly to the rotatable knife and the mode of mounting the same, and its object is to so construct the said knife that its rings or frame will be adapted to take the wear which would otherwise be borne by the blade edges, and to so mount the said knife within the machine that, while it will constantly rotate while the machine is in operation it is not constantly in position to bear closely against the conical shell,—its contact with the conical shell, and consequently its shearing action in connection therewith, being induced and governed by the pressure thereon of the material to be operated upon,—a further object being to provide a stop to limit the outward movement of the knife and prevent it from being so closely pressed against the conical shell as to retard the operation of the machine.

An embodiment of my invention, in connection with a convenient type of the machines indicated, is represented in the accompanying drawings and herein described, the particular subject matter claimed as novel being hereinafter definitely specified.

In the drawings, Figure 1 is a side elevational view of the entire machine. Fig. 2 is a central elevation partly in section of a machine embodying my invention. Fig. 3 is a front elevation of the machine represented in Figs. 1 and 2,—the ring 1 which binds the two parts of the shell tightly together being supposed removed. Fig. 4 is an end view of the knife. Fig. 5 is a central section of the conical shell,—the knife being represented within the same. Figs. 6 and 7 are respectively a view in perspective, and a fragmentary detail of the binding ring 1.

Similar letters of reference indicate corresponding parts.

In the accompanying drawings, $a$ denotes the casing of the machine, which casing is made up of two parts $a'$ and $a^2$. The part $a'$ has an inlet through the hopper $b$ near one end of the casing. A series of cutting ribs, $c$, extend from end to end upon the inner curved wall of part $a'$. In the end wall $a^3$ of part $a'$ a bearing is formed which supports the shaft $e'$ upon which the feed screw $e$ is supported.

The casing as a whole resembles two truncated cones joined at their bases, the longer cone (and the inclination of its wall is very slight) being the part $a'$ above described, and the shorter one consisting of the part $a^2$, the two parts being preferably secured together by means of a binding ring 1, although any other well known means or method may be employed. The part $a^2$ is preferably made conical to facilitate the adjusting of the knives. The outer end of the part $a^2$ has preferably an opening through which the end of the feed screw shaft $e'$ protrudes although the machine will work quite as well if the outer end of the part $a^2$ is closed and the cylindric extremity of the screw-shaft is cut off. The feed screw conforms in general outline to the frusto-conical interior part, $a'$, of the casing, one end of which screw has a shoulder, $e^2$, which prevents the movement of the feed screw toward the hopper. A spiral thread the edges of which are sharpened on the shaft $e'$ constitutes the feed screw.

The part $a^2$ is, as fully described in my former patent referred to, a conical shell, perforated with delivery holes $h'$, the edges of which form cutters which are opposed to the knives $g^x$ in the cutting of the material by the rotation of the knives,—and it is bound to the part $a'$ by means of the binding ring $l$, which, screwing upon the exterior of the large or delivery end of the part $a'$, has a flange or lip $l'$ which overhangs a flange $a^4$ on the part $a^2$, and holds the said conical shell tightly in place against the part $a'$. The flange $a^4$ of the conical shell is provided with a notch $a^5$, and when the parts $a'$ and $a^2$ are brought together the notch $a^5$ on the part $a^2$, fits upon a stud $a^6$ formed upon the end of the part $a'$, and rotation of the conical shell is prevented.

The rotatable knife G is adapted to be placed within the conical shell $a'$ and to operate in connection therewith.

A good form of a knife embodying my invention is that represented in the drawings, in which $g$ represents the ring at the large end of the knife, and $g'$ the disk hub at the small end of the knife, and $g^x$ represents four knife blades preferably formed with or mounted upon the parts $g$ and $g'$. The ring $g$ is sufficiently larger than the disk-hub $g'$ to render the inclination of the knife blades connected to them correspondent to the inclination of the conical shell $a^2$. The knife blades $g^x$ themselves are preferably formed, as represented in the drawings, slightly curved in cross section.

The peripheries of the ring $g$ and disk-hub $g'$ are formed or beveled so that they have an angular edge inclination coincident, and are flush or on the same plane, with the knife blade edges,—and the said parts therefore coincide with the lines of the frustum of a cone outlined by the knife blade edges. This construction allows the knife blades to approach in operation very closely to the inner surface of the conical shell, while the parts $g$ and $g'$ being subject to the same frictional contact with the conical shell as are the blade edges themselves, serve, when the knife is pressed into frictional contact with the conical shell, to take the wear otherwise coming on the blade edges.

Upon the shaft $e'$ and just within the bearing formed for it in the end of the conical shell $a^2$ is conveniently but not necessarily formed a square or polygonal seat $j$. The disk-hub $g'$ of the knife has a central orifice $g^2$ of outline correspondent to the seat $j$,—which adapts the knife to be seated thereon and to be rotated therewith. The length of the seat $j$ is in excess of the thickness of the disk hub $g'$, and this is necessary as is hereinafter more fully described, to allow the knife the freedom of longitudinal movement essential in carrying out my invention.

The knife as a whole is slightly less in length than the space allotted for it in the conical shell, and this also to allow of the necessary movement of the knife.

Upon the inner face of the small end of the conical shell and surrounding the bearing therein is conveniently formed an annular rib K which may, indeed, be the inner face itself of said end, against which the disk hub $g'$ bears or abuts when it arrives at the outward limit of its movement, and when its exterior is in working contact with the interior of the shell.

That end of the shaft which passes through the wall $a^3$ is squared, for the convenient application of a crank handle M or other device for imparting rotation to the shaft.

The operation of my device will be readily understood. Assume the machine stationary and empty, and the rotatable knife moved back on its seat so that its blades are not in close contact with the conical shell. Rotation being imparted to the shaft by the operation of the handle, material fed to the hopper is carried forward by the screw toward the delivery end of the machine. In its passage thither it is through the conjoint shear-like action of the sharp cutting ribs within the part $a'$ and the thread on the shaft, to a large extent, divided. Reaching the outer end of the part $a'$, the material is delivered into the conical shell and within and behind the blades of the rotating knife. Continued delivery of material into the conical shell will soon fill it, and the pressure of the material against the disk hub and the blades of the rotating knife will push the knife outwardly on its seat and force its blade edges into close contact with the inner face of the conical shell, when it will be in position to begin and continue its function of shearing off from the main body of the substance acted upon all such parts as are pressed between the blades and into the orifices of the conical shell. The knife will thus be held in shearing contact with the conical shell as long as material is fed into the machine. Upon cessation of the supply of material to be acted upon, the knife, although of course continuing to rotate as long as the machine is operated, will no longer be held tightly against the conical shell. The annular rib K described serves to prevent any binding of the knife when unusual pressure is put upon it.

The length of longitudinal play of the knife itself is limited by the size of the conical shell and the amount of space left therein for such play, and such length is a matter which is to be predetermined, and regulated by the character of the material to be operated upon.

As is obvious, knives mounted in the manner described, the edges of which are prevented by the end rings $g$ and $g'$ and the rib K from grinding against the edges of the perforations opposed to them during the operation, will last much longer than when constructed and mounted in the manner heretofore in use, for while heretofore such knives have been adjustable by means of screw rings or other devices forcing them against a perforated plate, they have not been self-adjustable.

It is obvious that the feature of taking the wear off of the rotatable knife blade edges as described above, is capable of application with meat cutting machines in general and not confined to machines of the construction described.

Many obvious modifications in mechanical construction may be resorted to in carrying out my invention. Thus instead of the hub and hub seat described, the hub disk may be simply feathered upon the shaft; and instead of the rib K being formed upon the conical shell it would answer the same purpose if formed upon the hub disk.

Having thus described my invention, I claim and desire to secure by Letters Patent:—

1. In a meat cutting machine, in combination, a cylindrical shell, provided with a feed inlet, a feed screw mounted in said shell, a conical shell provided with orifices at the delivery end of said shell, and a knife loosely and longitudinally adjustably mounted on the feed screw shaft, substantially as set forth.

2. In a meat cutting machine, in combination, a cylindrical shell, provided with a feed inlet, a feed screw mounted in said shell, a conical shell provided with orifices at the delivery end of said shell, a knife loosely and longitudinally adjustably mounted on the feed screw shaft, and a rib or stop interposed between the frame work of the knife and the said conical shell, substantially as specified.

In testimony whereof I have hereunto signed my name this 1st day of August, A. D. 1887.

OLIVER D. WOODRUFF.

In presence of—
ELLEN L. MERRELL,
E. G. VIRIAN.